United States Patent
Metzger et al.

(10) Patent No.: US 12,238,263 B2
(45) Date of Patent: Feb. 25, 2025

(54) MULTI-SPECTRAL VOLUMETRIC CAPTURE

(71) Applicants: Sony Group Corporation, Tokyo (JP); Sony Pictures Entertainment Inc., Culver City, CA (US)

(72) Inventors: Scott Metzger, Los Angeles, CA (US); David Bailey, Los Angeles, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 17/119,003

(22) Filed: Dec. 11, 2020

(65) Prior Publication Data
US 2021/0185297 A1    Jun. 17, 2021

Related U.S. Application Data

(60) Provisional application No. 62/947,684, filed on Dec. 13, 2019.

(51) Int. Cl.
*H04N 13/25*     (2018.01)
*H04N 13/257*    (2018.01)
*H04N 23/11*     (2023.01)
*H04N 23/54*     (2023.01)
*H04N 23/56*     (2023.01)
*H04N 23/90*     (2023.01)

(52) U.S. Cl.
CPC ........... *H04N 13/25* (2018.05); *H04N 13/257* (2018.05); *H04N 23/54* (2023.01); *H04N 23/90* (2023.01)

(58) Field of Classification Search
CPC ...... H04N 13/25; H04N 5/2253; H04N 5/247; H04N 13/257; H04N 5/2256; H04N 5/33; H04N 9/045; H04N 5/275; H04N 23/54; H04N 23/90; H04N 23/10; H04N 23/56; H04N 13/254; H04N 23/11; H04N 23/20
USPC ........................................................ 348/47
See application file for complete search history.

(56) References Cited

U.S. PATENT DOCUMENTS

| 2005/0215685 A1* | 9/2005 | Haines | C09D 7/41 |
| | | | 427/160 |
| 2006/0210146 A1* | 9/2006 | Gu | G06V 10/145 |
| | | | 382/154 |

(Continued)

FOREIGN PATENT DOCUMENTS

| CA | 2812021 A1 * | 10/2013 | ............ G03B 13/18 |
| JP | 2003232622 A | 8/2003 | |

(Continued)

*Primary Examiner* — Susan E. Torgerson
(74) *Attorney, Agent, or Firm* — Procopio, Cory, Hargreaves & Savitch LLP

(57) ABSTRACT

Video capture of a subject, including: a first IR camera, a second IR camera, and a color camera, for capturing video data of the subject; a post, where the first IR camera, the second IR camera, and the color camera are attached to the post, and where the color camera is positioned between the first IR camera and the second IR camera; at least one IR light source, for illuminating the subject; and a processor configured to: generate depth solve data for the subject using data from the first IR camera and the second IR camera; generate projected color data by using data from the color camera to project color onto the depth solve data; and generate final capture data by merging the depth solve data and the projected color data.

14 Claims, 3 Drawing Sheets

(56) References Cited

U.S. PATENT DOCUMENTS

| | | | |
|---|---|---|---|
| 2010/0231692 A1* | 9/2010 | Perlman | G06T 7/596 |
| | | | 348/48 |
| 2011/0117532 A1 | 5/2011 | Relyea et al. | |
| 2012/0253201 A1* | 10/2012 | Reinhold | H04N 13/254 |
| | | | 345/419 |
| 2013/0100256 A1* | 4/2013 | Kirk | G06T 7/593 |
| | | | 348/48 |
| 2013/0215235 A1 | 8/2013 | Russell | |
| 2013/0343601 A1* | 12/2013 | Jia | G06V 10/143 |
| | | | 382/103 |
| 2014/0192158 A1 | 7/2014 | Whyte | |
| 2014/0307056 A1 | 10/2014 | Collet Romea | |
| 2017/0094141 A1 | 3/2017 | Hicks | |
| 2018/0220048 A1 | 8/2018 | Tamir et al. | |
| 2019/0253638 A1* | 8/2019 | Wen | H04N 5/23219 |
| 2019/0306488 A1 | 10/2019 | Wang | |
| 2020/0007853 A1* | 1/2020 | Mlinar | H04N 9/07 |

FOREIGN PATENT DOCUMENTS

| | | |
|---|---|---|
| JP | 2008537190 A | 9/2008 |
| JP | 2016513804 A | 5/2016 |
| WO | WO-2018129104 A1 | 7/2018 |

\* cited by examiner

MULTI-SPECTRAL VOLUMETRIC CAPTURE

CROSS-REFERENCE TO RELATED APPLICATIONS

This application claims the benefit of priority under 35 U.S.C. § 119(e) of U.S. Provisional Patent Application No. 62/947,684, filed Dec. 13, 2019, entitled "Multi-Spectral Volumetric Capture." The disclosure of the above-referenced application is incorporated herein by reference.

BACKGROUND

Field

The present disclosure relates to video capture of a subject, and more specifically, to video capture using a combination of multi-spectral infrared and color cameras.

Background

Green or blue screen is often used to capture motions of a subject and the motions are later composited with custom backgrounds in special effects. However, avoiding using a green screen can be useful because green screen capture imposes restrictions on lighting of the subject and can also introduce "color bleeding" of the green background onto the subject.

SUMMARY

The present disclosure provides for video capture of a subject using a combination of multi-spectral infrared (IR) and color cameras combined with an IR pattern.

In one implementation, a system for video capture of a subject is disclosed. The system includes: a first IR camera, for capturing video data of the subject; a second IR camera, for capturing the video data of the subject; a color camera, for capturing the video data of the subject; a post, where the first IR camera, the second IR camera, and the color camera are attached to the post, and where the color camera is positioned between the first IR camera and the second IR camera; at least one IR light source for illuminating the subject; and a processor connected to the first IR camera, the second IR camera, and the color camera, wherein the processor is configured to: generate depth solve data for the subject using data from the first IR camera and the second IR camera; generate projected color data by using data from the color camera to project color onto the depth solve data; and generate final capture data by merging the depth solve data and the projected color data.

In another implementation, a method for video capture of a subject is disclosed. The method includes: generating depth solve data for the subject using data from a first IR camera and a second IR camera; generating projected color data using data from a color camera to project color onto the depth solve data; and generating final capture data by merging the depth solve data and the projected color data, where the color camera is positioned between the first IR camera and the second IR camera.

In another implementation, a non-transitory computer-readable storage medium storing a computer program to capture video of a subject is disclosed. The computer program including executable instructions that cause a computer to: generate depth solve data for the subject using data from a first IR camera and a second IR camera; generate projected color data using data from a color camera to project color onto the depth solve data; and generate final capture data by merging the depth solve data and the projected color data, wherein the color camera is positioned between the first IR camera and the second IR camera.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, a conventional green screen capture imposes restrictions on lighting of the subject and can also introduce "color bleeding" of the green background onto the subject.

Certain implementations of the present disclosure provide systems and methods for processing video data. In one implementation, a video system captures video data for a subject and environment and background, using a combination of multi-spectral IR and color cameras combined with an IR pattern. This system captures volumetric data without using a green screen to separate the subject from the background with depth. This makes it possible to light the subject freely without the concern for the background.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Features provided in implementations can include, but are not limited to, one or more of the following items: (a) a point triangulation of depth using structure from motion tie points; (b) a combination of infrared and color cameras; (c) cameras are placed in a specific order: IR, color, IR, where the left and right IR cameras are used for depth solve with contribution of two or more IR cameras; (d) IR LED floodlights are used to illuminate subject of IR depth capture to create matte; (e) the center color camera (which captures visible spectrum light data) is used to project color on to the IR camera depth solve; (f) a minimum of one group of three cameras is used, but extensible to N groups of three cameras depending on the subject; and (g) an IR absorbing pigment is used to block the IR light returning to the sensor.

In one implementation, the video system is used in a video production or studio environment and includes one or more cameras for image capture, one or more sensors, and one or more computers to process the camera and sensor data. By using structure for motion with a combination of IR and color cameras, the system captures volumetric data with complete freedom for lighting and exposure of the captured subject without using a green screen. Avoiding using a green screen is useful because green screen capture imposes restrictions on lighting of the subject and can also introduce "color bleeding" of the green background onto the subject.

Figure 1:
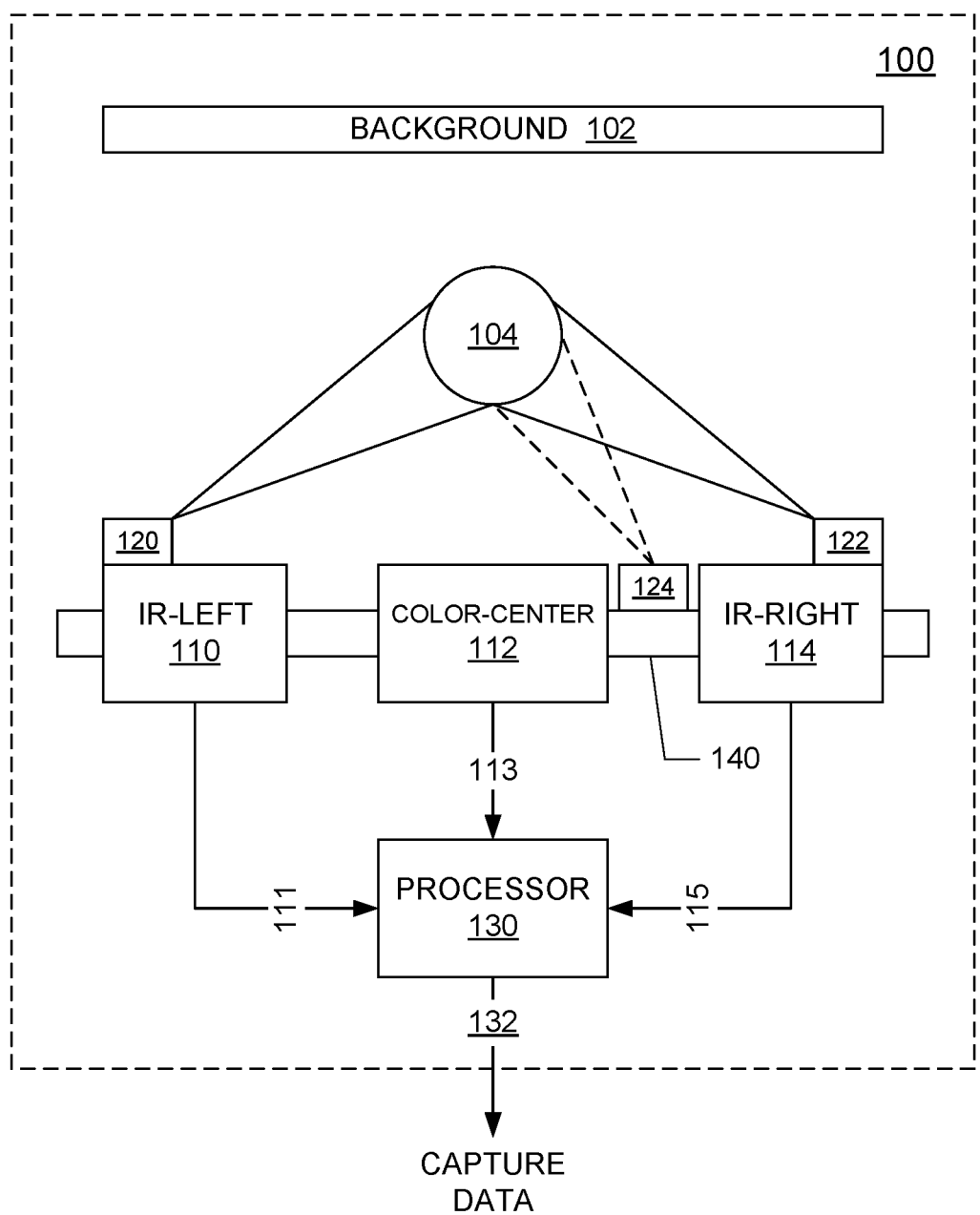
FIG. 1 is a block diagram of a video system for video capture in accordance with one implementation of the present disclosure.

FIG. 1 is a block diagram of a video system 100 for video capture in accordance with one implementation of the present disclosure. In the illustrated implementation of FIG. 1, the video system 100 includes a first IR camera 110, a second IR camera 114, a color camera 112, a post 140, at least one IR light source 120, 122, and a processor 130.

In one implementation, the first IR camera 110, the second IR camera 114, and the color camera 112 are configured to capture video data of a subject 104. Two IR cameras are used for depth solves. Further, in one implementation, the first IR camera 110, the second IR camera 114, and the color camera 112 are all attached to a post 140 such that the color camera 112 is positioned between the first IR camera 110 and the second IR camera 114. In another implementation, the color camera 112 is positioned between the first IR camera 110 and the second IR camera 114 without having to attach to the post 140, but positioned with other means such as being attached together or positioned on a table. In a further implementation, the IR light sources 120, 122 are configured to illuminate the subject 104.

In one implementation, the processor 130 is connected to the first IR camera 110, the second IR camera 114, and the color camera 112. The processor 130 is configured to: (a) generate depth solve data 111, 115 for the subject using data from the first IR camera 110 and the second IR camera 114; (b) generate projected color data 113 by using data from the color camera 112 to project color onto the depth solve data 111, 115; and (c) generate final capture data 132 by merging the depth solve data 111, 115 and the projected color data 113. The processor 130 uses data from all the cameras to generate the final capture data. Further, the processor 130 uses data from all the cameras to generate the final capture data.

In a further implementation, the video system 100 includes at least one more color camera and at least two more IR cameras to capture video data of the subject 104. In another implementation, the cameras are arranged in groups of three cameras to form a system of nodes, with each node having two IR cameras and a color camera.

In a further implementation, the video system 100 also includes a laser 124 attached to the post 140 for projecting a laser pattern on the subject 104. In one implementation, an 830 nm laser is projected from each camera node position to project a laser pattern on the subject, which helps with contrast and depth capture solve for the two IR cameras.

In a further implementation, each of the IR cameras 110, 114 includes a filter that removes visible light. In one implementation, the filter is a 700-715 nm high-cut filter. In one implementation, the video system 100 also includes IR floodlights (e.g., 850 nm LED floodlights) positioned around the subject 104 to illuminate the subject 104 with IR. This allows a luminance matte and constant edge around the subject 104 to separate the background 102 from the captured subject 104 to assist with depth generation. In one implementation, the background 102 is configured with an IR blocking paint to create a "black hole" behind the subject 104 that is being captured to keep tie points (which are features identified in two or more images and selected as reference points) for depth generation. The video system 100 uses structure from motion, and relies on image tie points between each view to measure the depth. In one implementation, an IR pigment is applied to the subject 104 to help with contrast and depth capture solve for the two or more IR cameras. The pigment reduces or stops the IR light from scattering into the skin.

In one example of a system operation, the video system is used for volumetric capture of a person. Before setting up the cameras, operators decide on coverage of the subject needed for the final production, for example, 180 degrees. The cameras are arranged into a system of nodes, for instance 3 posts with 3 rows of 3 cameras. The posts are arranged around the subject for maximum coverage. The cameras are all shutter synchronized. Then the video system captures the images and data for the subject using the cameras. The system performs a depth solve of the resulting IR data and projects the corresponding color camera data onto the solved depth data. The system merges the resulting depth and projected color data into a final full capture.

Figure 2:
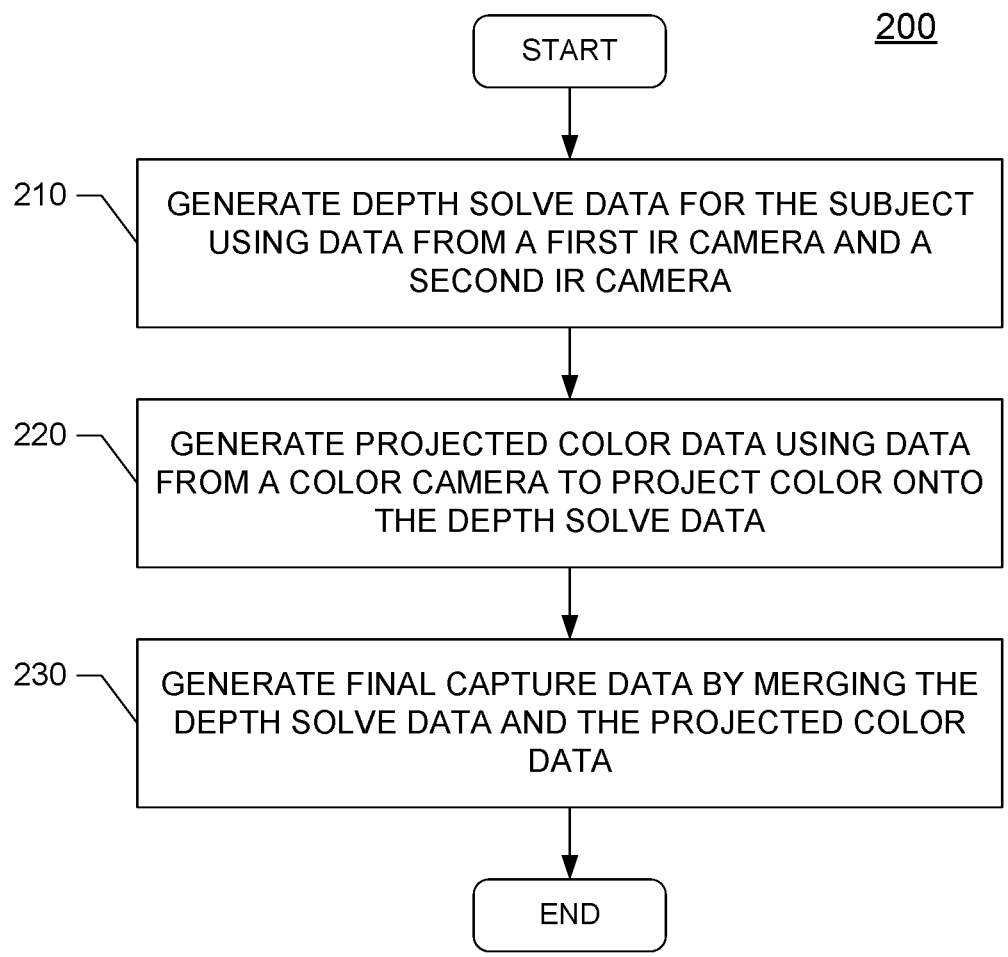
FIG. 2 is a flow diagram of a method for video capture of a subject in accordance with one implementation of the present disclosure.

FIG. 2 is a flow diagram of a method 200 for video capture of a subject in accordance with one implementation of the present disclosure. In the illustrated implementation of FIG. 2, depth solve data for the subject is generated, at block 210, using data from a first IR camera and a second IR camera. Further, projected color data is generated, at block 220, using data from a color camera to project color onto the depth solve data. At block 230, final capture data is then generated by merging the depth solve data and the projected color data, wherein the color camera is positioned between the first IR camera and the second IR camera.

In one implementation, the subject is illuminated using at least one IR light source. In a further implementation, at least one more color camera and at least two more IR cameras are arranged in groups of three cameras to form a system of nodes, with each node having two infrared cameras and a color camera. The final capture data is then generated using data from all the cameras. In a further implementation, a laser pattern is projected on the subject. In one implementation, the laser pattern is projected from each camera node position. In one implementation, each of the first IR camera and the second IR camera includes a filter that removes visible light. In one implementation, the filter is a high-cut filter in the range of 700-715 nm. In a further implementation, a background panel configured with an IR blocking paint is provided. In a further implementation, an IR pigment is applied to the subject.

Figure 3A:
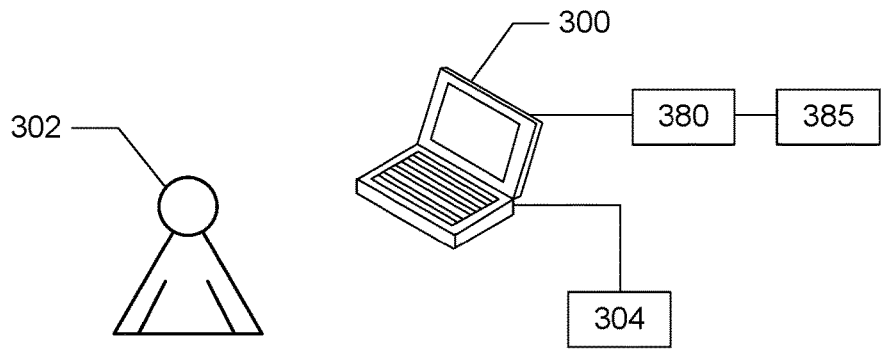
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a video application 390 for implementing a technique for video capture of a subject with respect to the video system 100 of FIG. 1 and the method 200 of FIG. 2.

Figure 3B:
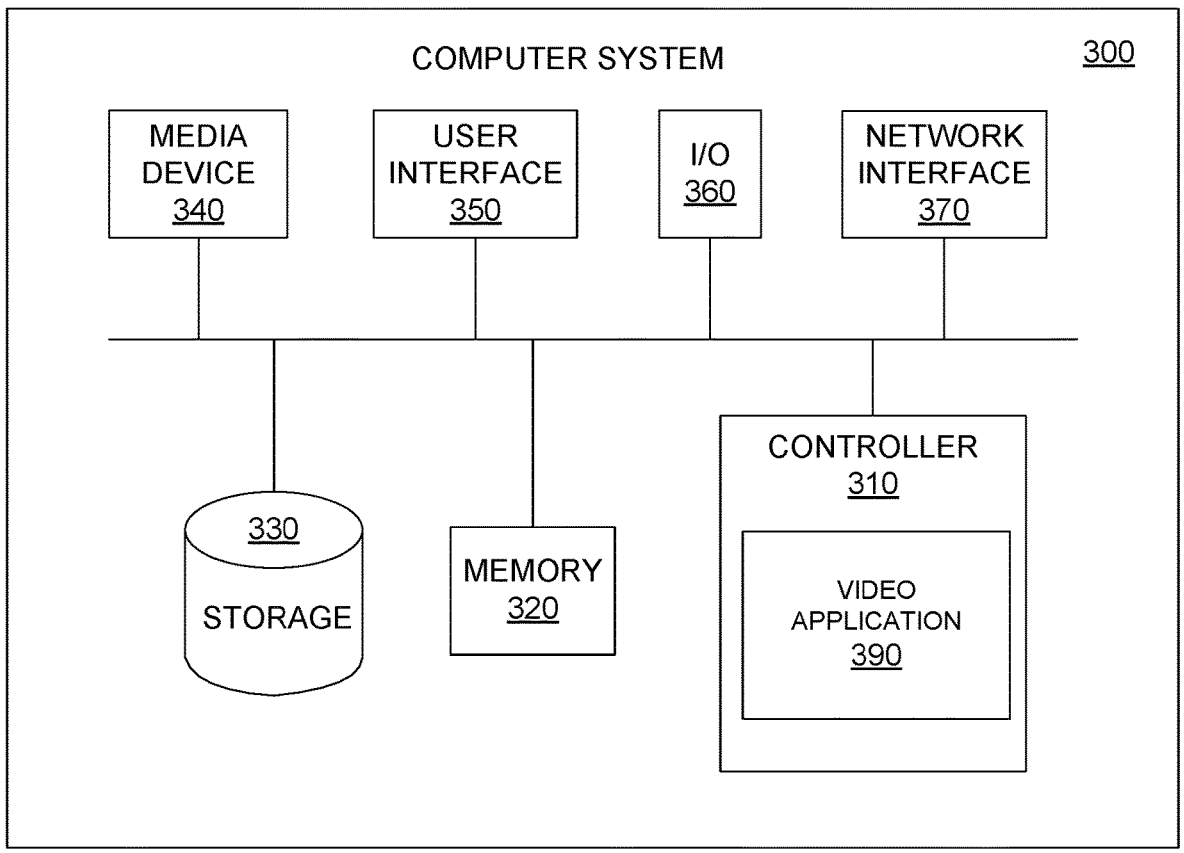
FIG. 3B is a functional block diagram illustrating the computer system hosting a video application in accordance with an implementation of the present disclosure.

The computer system 300 stores and executes the video application 390 of FIG. 3B. In addition, the computer system 300 may be in communication with a software program 304. Software program 304 may include the software code for the video application 390. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the video application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the video application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the video application 390 with a software system, such as to enable video capture of a subject. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the video application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Accordingly, additional variations and implementations are also possible. For example, in addition to video production for movies or television, implementations of the system and methods can be applied and adapted for other applications, such as virtual production (e.g., virtual reality environments) for movies, television, games, other volumetric capture systems and environments, or in other capture systems to replace a green screen operation.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for video capture of a subject by separating the subject from background using a black hole behind the subject, the system comprising:
   at least one IR light source for illuminating the subject with IR light,
   wherein the at least one IR light source includes IR floodlights positioned around the subject to illuminate the subject with the IR light and to allow a luminance matte and constant edge around the subject to separate the background from the subject to assist with depth generation;
   a background panel configured with an IR blocking paint to generate a structure from motion including the black hole behind the subject that is being captured to keep tie points between two or more images of the captured video of the subject to measure depth to separate the subject from the background,
   wherein the tie points are features identified in the two or more images and selected as reference points;
   a first infrared (IR) camera and a second IR camera for capturing video data of the subject with the black hole behind the subject, wherein each of the first IR camera and the second IR camera includes an IR filter that removes visible light, and
   wherein an IR pigment is applied to the subject to reduce the IR light from scattering into skin of the subject;
   a color camera, for capturing the video data of the subject, and where the color camera is positioned between the first IR camera and the second IR camera; and
   a processor connected to the first IR camera, the second IR camera, and the color camera, wherein the processor is configured to: generate depth solve data from the captured video data of the subject; generate projected color data by using data from the color camera to project color onto the depth solve data; and generate final capture data by merging the depth solve data and the projected color data,
   wherein the IR floodlights positioned around the subject, the background configured with the IR blocking paint, the IR pigment applied to the subject, the IR filter in each of the first and second IR cameras, and the processor, combine to provide the video capture of the subject by separating the subject from the background.

2. The system of claim 1, further comprising:
   at least two more IR cameras; and
   at least one more color camera.

3. The system of claim 2, wherein the cameras are arranged in groups of three cameras to form a system of nodes, with each node having two infrared cameras and a color camera.

4. The system of claim 2, wherein the processor uses data from all the cameras to generate the final capture data.

5. The system of claim 1, further comprising a laser for projecting a laser pattern on the subject.

6. The system of claim 5, wherein the laser is configured to project from each camera node position.

7. The system of claim 1, wherein the filter is a high-cut filter in the range of 700-715 nm.

8. A method for video capture of a subject by separating the subject from background using a black hole behind the subject, the method comprising:
   illuminating the subject using at least one IR light source, wherein the at least one IR light source includes IR floodlights positioned around the subject to illuminate the subject and to allow a luminance matte and constant edge around the subject to separate the background from the subject to assist with depth generation;
   generating a structure from motion including the black hole behind the subject that is being captured to keep tie points between two or more images of the captured video of the subject to measure depth by providing a background panel configured with an IR blocking paint to separate the subject from the background,
   wherein the tie points are features identified in the two or more images and selected as reference points;
   capturing video of the subject with the black hole behind the subject using a first IR camera and a second IR camera, wherein each of the first IR camera and the second IR camera includes an IR filter that removes visible light, and
   wherein an IR pigment is applied to the subject to reduce the IR light from scattering into skin of the subject;
   generating depth solve data from the captured video of the subject;
   generating projected color data using data from a color camera to project color onto the depth solve data; and
   generating final capture data by merging the depth solve data and the projected color data, wherein the color camera is positioned between the first IR camera and the second IR camera,
   wherein the IR floodlights positioned around the subject, the background configured with the IR blocking paint, the IR pigment applied to the subject, the IR filter in each of the first and second IR cameras, generation of depth solve data, generation of projected color data, and generation of final capture data, combine to provide the video capture of the subject by separating the subject from the background.

9. The method of claim 8, further comprising:
   arranging at least two more IR cameras and at least one more color camera in groups of three cameras to form a system of nodes, with each node having two infrared cameras and a color camera.

10. The method of claim 9, wherein the final capture data is generated using data from all the cameras.

11. The method of claim 8, further comprising
   projecting a laser pattern on the subject.

12. The method of claim 11, wherein the laser pattern is projected from each camera node position.

13. The method of claim 8, wherein the filter is a high-cut filter in the range of 700-715 nm.

14. A non-transitory computer-readable storage medium storing a computer program to capture video of a subject by separating the subject from background using a black hole behind the subject, the computer program comprising executable instructions that cause a computer to:
   illuminate the subject using at least one IR light source, wherein the at least one IR light source includes IR floodlights positioned around the subject to illuminate the subject and to allow a luminance matte and constant edge around the subject to separate the background from the subject to assist with depth generation;
   generate a structure from motion including the black hole behind the subject that is being captured to keep tie points between two or more images of the captured video of the subject to measure depth by providing a background panel configured with an IR blocking paint to separate the subject from the background,
   wherein the tie points are features identified in the two or more images and selected as reference points;
   capture video of the subject with the black hole behind the subject using a first IR camera and a second IR camera, wherein each of the first IR camera and the second IR camera includes an IR filter that removes visible light, and
   wherein an IR pigment is applied to the subject to reduce the IR light from scattering into skin of the subject;
   generate depth solve data from the captured video of the subject;
   generate projected color data using data from a color camera to project color onto the depth solve data; and
   generate final capture data by merging the depth solve data and the projected color data,
   wherein the color camera is positioned between the first IR camera and the second IR camera,
   wherein the IR floodlights positioned around the subject, the background configured with the IR blocking paint, the IR pigment applied to the subject, the IR filter in each of the first and second IR cameras, generation of depth solve data, generation of projected color data, and generation of final capture data, combine to provide the video capture of the subject by separating the subject from the background.

* * * * *